(12) United States Patent
Harada

(10) Patent No.: US 8,190,559 B2
(45) Date of Patent: May 29, 2012

(54) DOCUMENT MANAGEMENT APPARATUS, STORAGE MEDIUM STORING PROGRAM FOR DOCUMENT MANAGEMENT APPARATUS, AND METHOD FOR MANAGING DOCUMENTS

(75) Inventor: Hisahiro Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 11/458,734

(22) Filed: Jul. 20, 2006

(65) Prior Publication Data

US 2007/0182989 A1    Aug. 9, 2007

(30) Foreign Application Priority Data

Feb. 7, 2006 (JP) ................................. 2006-030236

(51) Int. Cl.
*G06F 17/30* (2006.01)
(52) U.S. Cl. ................ 707/608; 707/E17.008; 707/944; 715/229; 715/255
(58) Field of Classification Search ........... 707/E17.008, 707/607, 608; 715/229
See application file for complete search history.

(56) References Cited

U.S. PATENT DOCUMENTS

| | | | | |
|---|---|---|---|---|
| 5,706,452 A | * | 1/1998 | Ivanov | ........................... 715/751 |
| 7,257,770 B2 | * | 8/2007 | Narahara | ...................... 715/234 |
| 7,302,674 B1 | * | 11/2007 | Gladieux et al. | .............. 717/101 |
| 2002/0133395 A1 | * | 9/2002 | Hughes et al. | .................. 705/11 |
| 2003/0061245 A1 | * | 3/2003 | Soria et al. | ..................... 707/203 |
| 2007/0271504 A1 | * | 11/2007 | Horvitz | ......................... 715/513 |
| 2008/0015968 A1 | * | 1/2008 | Van Luchene et al. | ......... 705/37 |

FOREIGN PATENT DOCUMENTS

| | | |
|---|---|---|
| JP | 6-259293 | 9/1994 |
| JP | 2001-175516 | 6/2001 |
| JP | 2002-251304 | 9/2002 |
| JP | 2004-78331 A | 3/2004 |
| JP | 2004-206466 | 7/2004 |

OTHER PUBLICATIONS

"Japanese Office Action" mailed by JPO and corresponding to Japanese application No. 2006-030236 on Mar. 15, 2011, with English translation.

* cited by examiner

*Primary Examiner* — John E Breene
*Assistant Examiner* — Albert Phillips, III
(74) *Attorney, Agent, or Firm* — Fujitsu Patent Center

(57) ABSTRACT

A document management apparatus includes: an acquisition unit for acquiring document file data and document file related data; a review period setting unit for setting a period in which the document file data is reviewed depending on the significance of the document file data as a data item in the document file related data; a first determination unit for determining based on the review period whether or not a review date on which the document file data is to be reviewed has come; and a first notification unit for prompting a user to review the document file data according to the first determination unit. The significance depending on the strategic importance of a document can be added to the document file. If the review date has come based on the significance, the user can be prompted to review the document file.

15 Claims, 12 Drawing Sheets

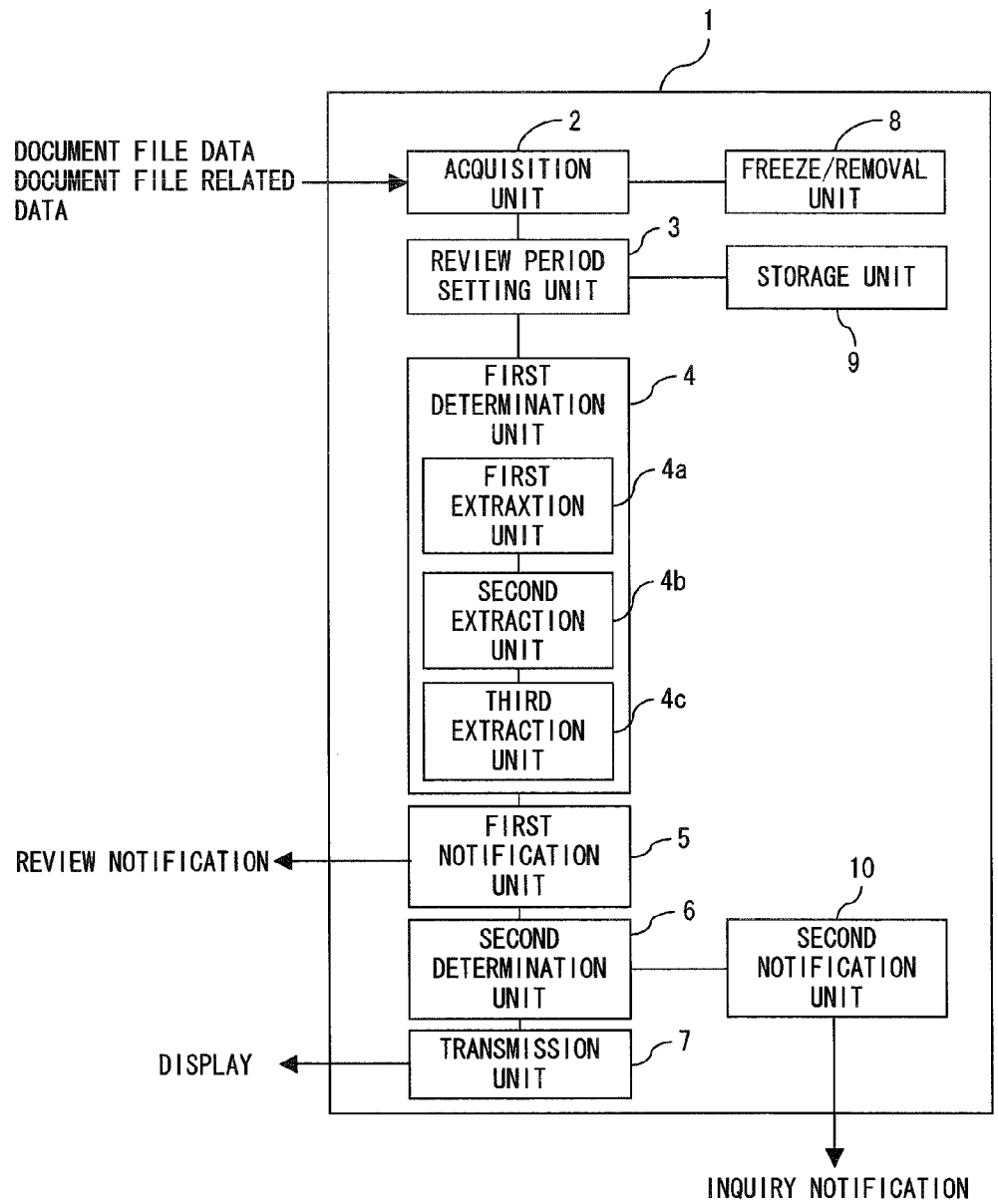
F I G. 1

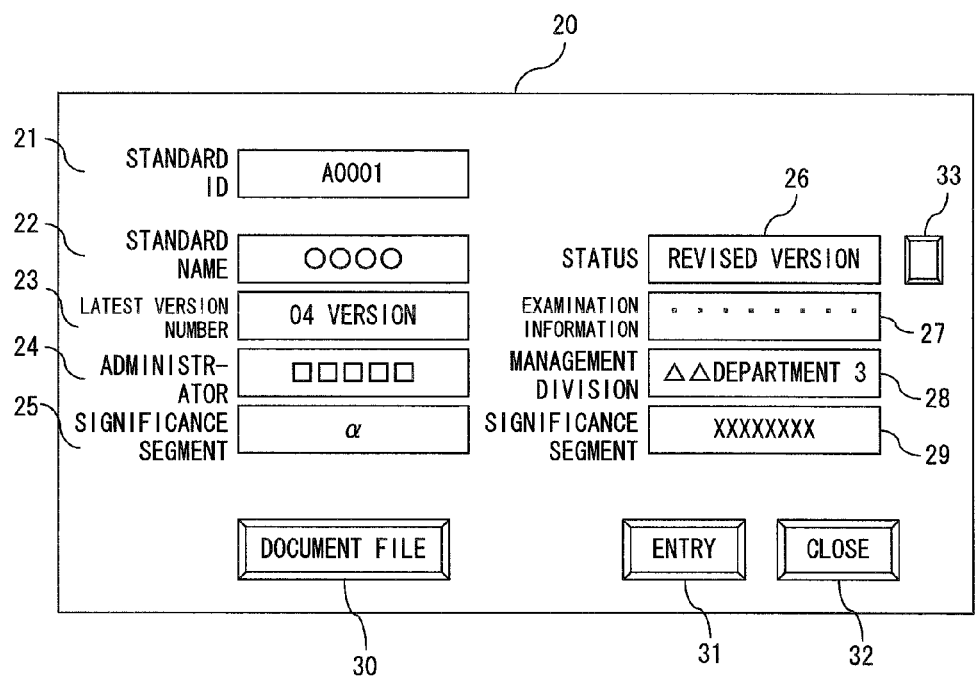
F I G. 4

FIG. 7

| STANDARD ID (71) | STANDARD NAME (72) | VERSION NUMBER (73) | ADMINISTRATOR (74) | SIGNIFICANCE SEGMENT (75) | STATUS (76) | EXAMINATION INFORMATION (77) | MANAGEMENT DIVISION (78) | ATTRIBUTE INFORMATION (79) | REVIEW PERIOD (80) | DOCUMENT EXAMINATION APPROVAL DATE (81) | DOCUMENT UPDATE APPROVAL DATE (82) | REMOVAL FLAG (83) | FREEZE FLAG (84) | ... |
|---|---|---|---|---|---|---|---|---|---|---|---|---|---|---|
| A0001 | ○○○○ | 01 | □□□□□ | α | INITIAL VERSION | ... | △△ DEPARTMENT 3 | XXXXXXX | HALF YEAR | 2003/4/25 | 2003/4/25 | OFF | OFF | ... |
| A0001 | ○○○○ | 02 | □□□□□ | α | REVISED VERSION | ... | △△ DEPARTMENT 3 | XXXXXXX | HALF YEAR | 2003/10/25 | 2003/10/25 | OFF | OFF | ... |
| A0001 | ○○○○ | 03 | □□□□□ | α | REVISED VERSION | ... | △△ DEPARTMENT 3 | XXXXXXX | HALF YEAR | 2004/4/25 | 2004/4/25 | OFF | OFF | ... |
| A0001 | ○○○○ | 04 | □□□□□ | α | REVISED VERSION | ... | △△ DEPARTMENT 3 | XXXXXXX | HALF YEAR | 2004/10/25 | 2004/10/25 | OFF | OFF | ... |
| A0002 | ∗∗∗∗ | 01 | □□□□□ | β | INITIAL VERSION | ... | △△ DEPARTMENT 1 | XXXXXXX | ONE YEAR | 2004/2/1 | 2004/2/15 | OFF | OFF | ... |
| A0002 | ∗∗∗∗ | 02 | □□□□□ | γ | FREEZE | ... | △△ DEPARTMENT 1 | XXXXXXX | THREE YEARS | 2005/2/1 | 2005/2/1 | OFF | ON | ... |
| A0003 | ×××× | 01 | □□□□□ | γ | INITIAL VERSION | ... | △△ DEPARTMENT 2 | XXXXXXX | THREE YEARS | 2004/2/15 | 2004/2/15 | OFF | OFF | ... |
| A0003 | ×××× | 02 | □□□□□ | γ | REMOVE | ... | △△ DEPARTMENT 2 | XXXXXXX | THREE YEARS | 2005/2/1 | 2005/2/1 | ON | OFF | ... |

70

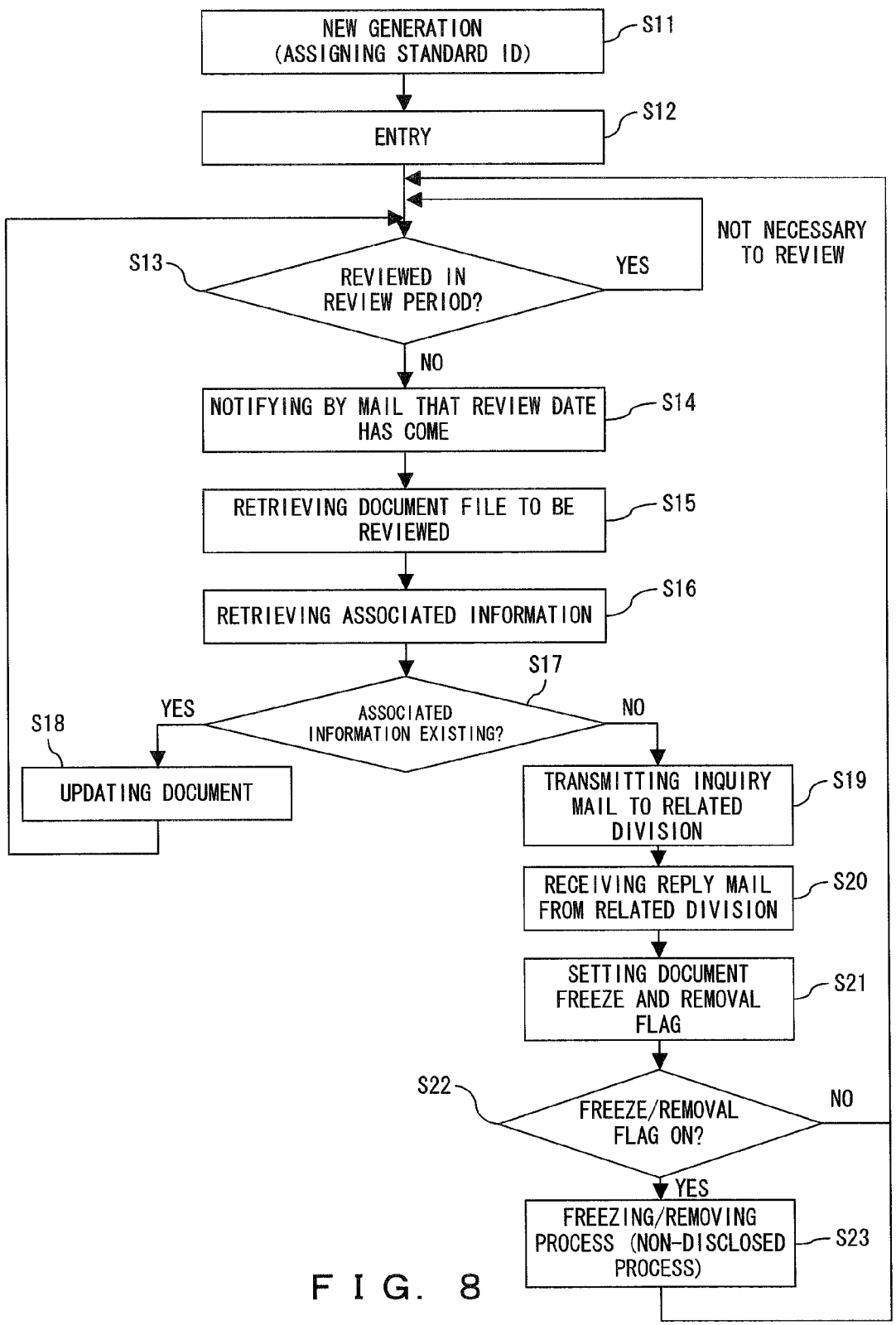
F I G. 8

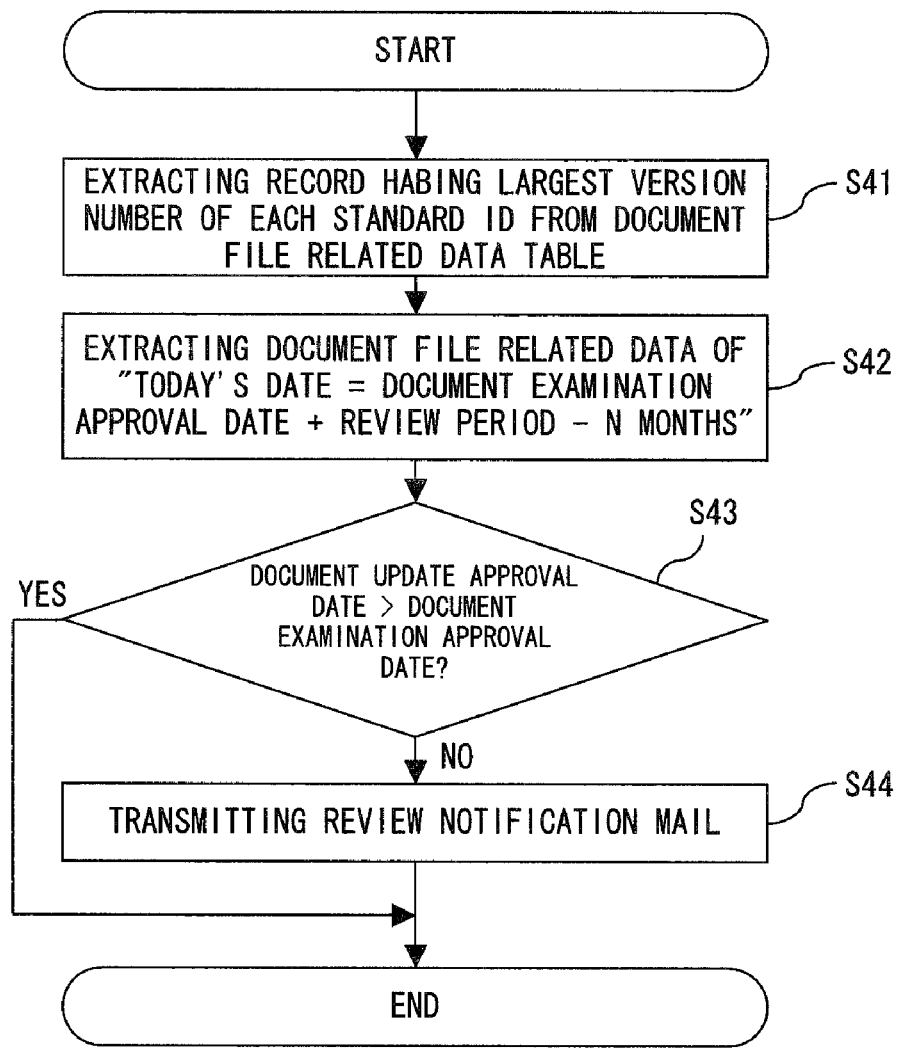
F I G. 1 0

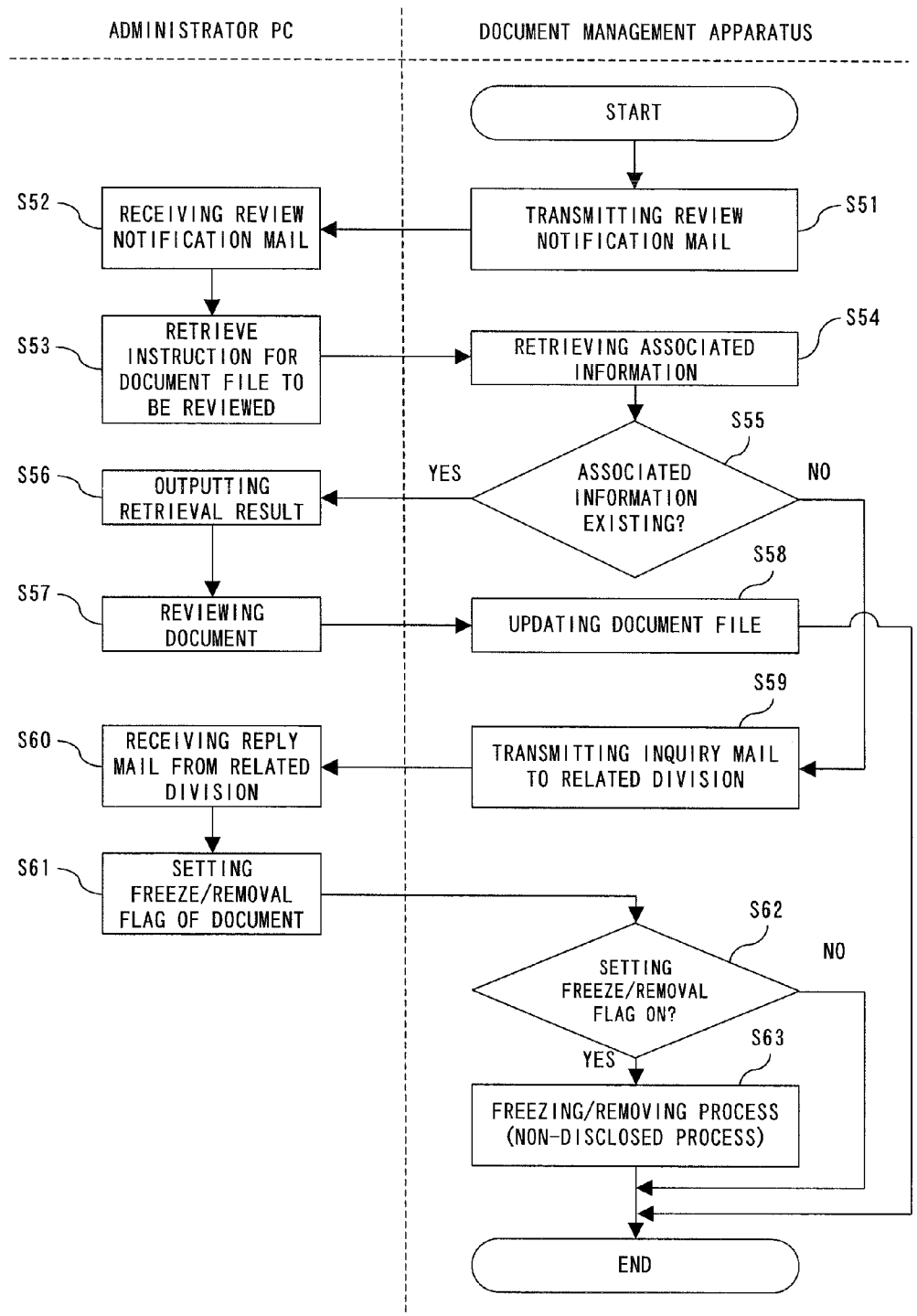
F I G. 1 1

DOCUMENT MANAGEMENT APPARATUS, STORAGE MEDIUM STORING PROGRAM FOR DOCUMENT MANAGEMENT APPARATUS, AND METHOD FOR MANAGING DOCUMENTS

BACKGROUND OF THE INVENTION

1. Field of the Invention

The present invention relates to the management of an electronic document file.

2. Description of the Related Art

Recently, it has been requested that quality control is to be improved by, for example, acquiring an approval of the ISO (International Organization for Standardization), receiving a periodic examination after the approval, etc. It is necessary to perform the quality control by reviewing a document file about a target product and updating it as necessary based on a so-called PDCA cycle (plan→do→check →act). It is also necessary not only to update the document file, but also trace a previous document file. Therefore, in the quality control, it is important not only to update a document, but also to keep a history of the document. Conventionally, the management of a document has been disclosed by, for example, Japanese Published Patent Application No. H06-259293, Japanese Published Patent Application No. 2001-175516, Japanese Published Patent Application No. 2002-251304, and Japanese Published Patent Application No. 2004-206466.

The Japanese Published Patent Application No. H06-259293 discloses an apparatus for collectively deleting unnecessary documents by managing a document file by an access frequency and a user ID, and deleting only document files which have not been accessed for a predetermined period in the documents generated by a user.

The Japanese Published Patent Application No. 2001-175516 discloses an electronic filing apparatus for transferring a document file which is stored in a storage device and has a low use frequency to an external device, and deleting the document file from the storage device.

The Japanese Published Patent Application No. 2002-251304 discloses a document management apparatus for setting attribute information indicating the importance for each document file, and deleting only a document file whose value of the attribute information is smaller than a reference value after a storage term has passed.

The Japanese Published Patent Application No. 2004-206466 discloses a document management apparatus capable of notifying a first user of a document file having a low use frequency, provisionally deleting the document file by the first user, notifying a second user of the deletion information, finally making determination by the second user, and practically letting the document file.

However, although a conventional system manages a document file depending on the use frequency of the document file, it hardly performs the management depending on the significance of the document file. That is, conventionally, a document that is important (confidential) in strategy for a corporation and a document that is not so important have been managed at the same level. Furthermore, the review period for each document file has been uncertain and the histories of files have not been managed.

Therefore, there has been the possibility that a document file not to be frequently reviewed is frequently reviewed, or a document file to be frequently reviewed is rarely reviewed. Furthermore, since history management is not appropriately performed, it is necessary to check a document file updated at a specific time, thereby wasting time.

The management of review of a document file and associated update have been manually performed. Therefore, there has been the possibility that a user forgets reviewing a document file in a review period, and makes an obsolete document file. Furthermore, with an increasing number of documents to be reviewed, the trouble and the load of reviewing the documents also increase.

SUMMARY OF THE INVENTION

The present invention provides a document management apparatus, a storage medium storing the associated program, and the associated method for adding the significance depending on the strategy of a document to a document file, and prompting review of a document file when a review date depending on the significance comes.

The document management apparatus for managing document file data according to the present invention includes:

an acquisition unit for acquiring the document file data, and document file related data as the data relating to the document file data;

a review period setting unit for setting a period in which the document file data is reviewed based on the significance segment set depending on the significance of the document file data as a data item in the document file related data;

a first determination unit for determining based on the review period whether or not the review date on which the document file data is to be reviewed has come; and a first notification unit for prompting a user to review the document file data according to the first determination unit.

A computer-readable storage medium storing a document management program used to direct a computer to perform a process of managing document file data according to the present invention includes:

an acquiring process of acquiring the document file data, and document file related data as the data relating to the document file data;

a review period setting process of setting a period in which the document file data is reviewed based on the significance segment set depending on the significance of the document file data as a data item in the document file related data;

a first determining process of determining based on the review period whether or not the review date on which the document file data is to be reviewed has come; and a first notifying process of prompting a user to review the document file data according to the first determining process.

A document managing method for managing document file data according to the present invention includes:

acquiring the document file data, and document file related data as the data relating to the document file data;

setting a period in which the document file data is reviewed based on the significance segment set depending on the significance of the document file data as a data item in the document file related data;

determining based on the review period whether or not the review date on which the document file data is to be reviewed has come; and issuing a notification to prompt a user to review the document file data based on the determination result.

BRIEF DESCRIPTION OF THE DRAWINGS

FIG. 1 shows the concept of the configuration of the document management apparatus according to the present invention.

FIG. 4 shows the document file entry screen according to an embodiment of the present invention;

FIG. 7 is a document file related data table according to an embodiment of the present invention;

FIG. 8 shows the flow of the operation of a document management apparatus 11 according to an embodiment of the present invention;

FIG. 10 is a flowchart of the process of checking a review period of the document management apparatus 11 according to an embodiment of the present invention;

FIG. 11 is a flowchart of the process to be performed in reviewing by the document management apparatus 11 according to an embodiment of the present invention.

DESCRIPTION OF THE PREFERRED EMBODIMENTS

Figure 2:
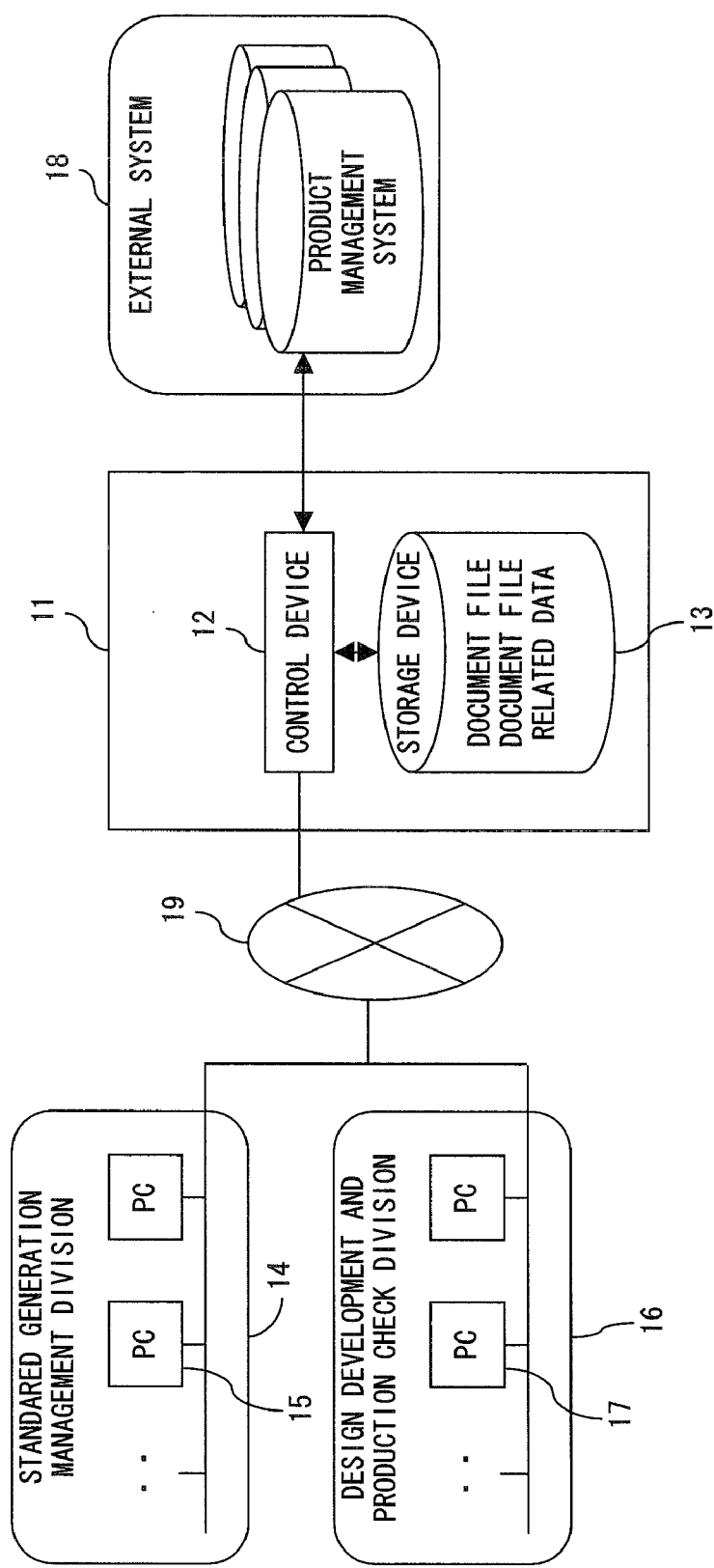
FIG. 2 shows the abstract of the configuration of the document management system according to an embodiment of the present invention.

The document management apparatus for managing document file data according to the present invention comprises: an acquisition unit for acquiring the document file data, and document file related data as the data relating to the document file data; a review period setting unit for setting a period in which the document file data is reviewed based on the significance segment set depending on the significance of the document file data as a data item in the document file related data; a first determination unit for determining based on the review period whether or not the review date on which the document file data is to be reviewed has come; and a first notification unit for prompting a user to review the document file data according to the first determination unit.

With the above-mentioned configuration, a user can receive a notification that a document file is to be reviewed in a review period depending on the significance of the document file, thereby reviewing the document file in the review period without fail.

In the document management apparatus, the first determination unit can further determine whether or not the document file data has already been reviewed in the review period.

With the above-mentioned configuration, if the document file data has already been reviewed in the review period, a document file has been updated. Therefore, it is not necessary to prompt a user to review the data.

In the document management apparatus, the document file related data includes at least a document ID for identification of the document file data, a significance segment set depending on the significance of the document file data, the version number of the document file data, the examination date on which an examination is performed when the document file data is updated, and an update date of the document file data. Additionally, the document management apparatus includes a storage unit for storing the document file related data.

With the configuration, the document file related data can be stored. Therefore, as described later, a document file updated on or after the document examination approval date can be removed from review targets using the document file related data.

A computer-readable storage medium storing a document management program used to direct a computer to perform the process of managing document file data according to the present invention allows a computer to perform: an acquiring process of acquiring the document file data, and document file related data as the data relating to the document file data; a review period setting process of setting a period in which the document file data is reviewed based on the significance segment set depending on the significance of the document file data as a data item in the document file related data; a first determining process of determining based on the review period whether or not the review date on which the document file data is to be reviewed has come; and a first notifying process of prompting a user to review the document file data according to the first determining process.

With the configuration, since a notification that a document file is to be reviewed in a review period can be received, the document file can be reviewed without fail in a review period depending on the significance of the document file.

The document managing method for managing document file data according to the present invention includes: acquiring the document file data, and document file related data as the data relating to the document file data; setting a period in which the document file data is reviewed based on the significance segment set depending on the significance of the document file data as a data item in the document file related data; determining based on the review period whether or not the review date on which the document file data is to be reviewed has come; and issuing a notification to prompt a user to review the document file data based on the determination result.

With the configuration, since a notification that a document file is to be reviewed in a review period can be received, the document file can be reviewed without fail in a review period depending on the significance of the document file.

FIG. 1 shows the concept of the configuration of the document management apparatus according to the present invention. A document management apparatus 1 comprises an acquisition unit 2, a review period setting unit 3, a first determination unit 4, a first notification unit 5, a second determination unit 6, a transmission unit 7, a freeze/removal unit 8, a storage unit 9, and a second notification unit 10.

The acquisition unit 2 acquires document file data and document file related data as the data related to the document file data. The document file related data includes, for example, a document ID (hereinafter referred to as a standard ID) for identification of document file data, a significance segment set depending on the significance of the document file data, a version number of the document file data, a examination date on which an examination is performed on the document file data, and an update date of the document file data.

The storage unit 9 stores at least document file data and document file related data. The review period setting unit 3 sets a period in which the document file data is reviewed based on a significance segment.

The first determination unit 4 determines based on the review period set by the review period setting unit whether or not a review date on which the document file data is to be reviewed has come. Furthermore the first determination unit determines whether or not the document file data has already been reviewed in the review period.

The first determination unit 4 comprises a first extraction unit 4a, a second extraction unit 4b, and a third extraction unit 4c. The first extraction unit 4a extracts the document file related data having the largest version number of each document ID on the document file related data stored in the storage unit 9. The second extraction unit 4b extracts the document file related data for which a review date has come based on the review period and the examination date set by the review period setting unit 3 in the document file related data extracted by the first extraction unit 4a. The third extraction unit 4c extracts the document file related data whose update date is later than the examination date of the document file related data extracted by the second extraction unit 4b.

The first notification unit 5 notifies according to the first determination unit 4 that the document file data is to be reviewed.

The second determination unit 6 determines whether or not there is associated data (data associated with document file data) of the document file data to be reviewed and noticed by the first notification unit 5.

When the second determination unit 6 determines that there is the associated data, the transmission unit 7 transmits the document file data, the document file related data, and the associated data to a client terminal. Thus, the client terminal can browse and update the document file.

When the second determination unit 6 determines that there is no associated data, the second notification unit 10 refers to the history information storing the information about which division has accessed the document file data and used, etc. According to the history information, the second notification unit 10 detects the user of the document file data, and notifies the user that the user is to inquire about the use status of the document file data.

The document file related data includes a flag indicating whether or not the document file data is to be frozen, and a flag indicating whether or not the document file data is to be removed other than those above data items.

The freeze/removal unit 8 restricts the reference of the document file data based on ON/OFF of the freeze flag or the removal flag of the document file related data acquired by the acquisition unit 2. Thus, the frozen or removed document file cannot be browsed by an external unit (client terminal).

FIG. 2 shows the outline of the configuration of the document management system according to an embodiment of the present invention. In the present embodiment, a document relating to the standards of a product (hereinafter referred to as a standard document or simply a document) is used as an example of a document to be managed, but the present invention is not limited to it, and various documents can be can be managed according to the present invention.

In FIG. 2, the document management system comprises the document management apparatus 11, a standard generation management division system 14, a design development and production check division system 16, an external system 18, and a network 19. The document management apparatus 11 is connected to the standard generation management division system 14 and the design development and production check division system 16 through the network 19. The document management apparatus 11 is also connected to the external system 18.

The standard generation management division system 14 is provided with a plurality of client terminals (hereinafter referred to as PCs 15). A user of the standard generation management division system 14 generates a document and updates the generated document using the PC 15. A plurality of client terminals (hereinafter referred to as PCs 17) are mounted in the design development and production check division system 16. A user of the design development and production check division system 16 can retrieve a necessary document and confirm the contents of the retrieved document using the PC 17.

The document management apparatus 11 is mainly constituted by a control device 12 and a storage device 13. The control device 12 reads a program from the storage device 13 according to the present embodiment, and performs the subsequent process. The process includes, for example, acquiring the information (document file related data) for management of the document file data input from the PC 15 and the document file, setting a review period, and answering a request to browse a document file from the PC 17. The control device 12 performs a predetermined process in cooperation with the external system 18, for example, a product management system, a design information management system, a parts management system, etc.

The storage device 13 stores at least document file data and document file related data. The document file data relates to the standard of a product generated by the PC 15 according to the present embodiment. The document file related data is used in managing the document file data.

According to the present embodiment, the important device of the document management system is constituted by one server device (document management apparatus 11), but it is not limited to the device, and can be constituted by a plurality of server devices (for example, a WEB server, a database server, a mail server, etc.).

Figure 3:
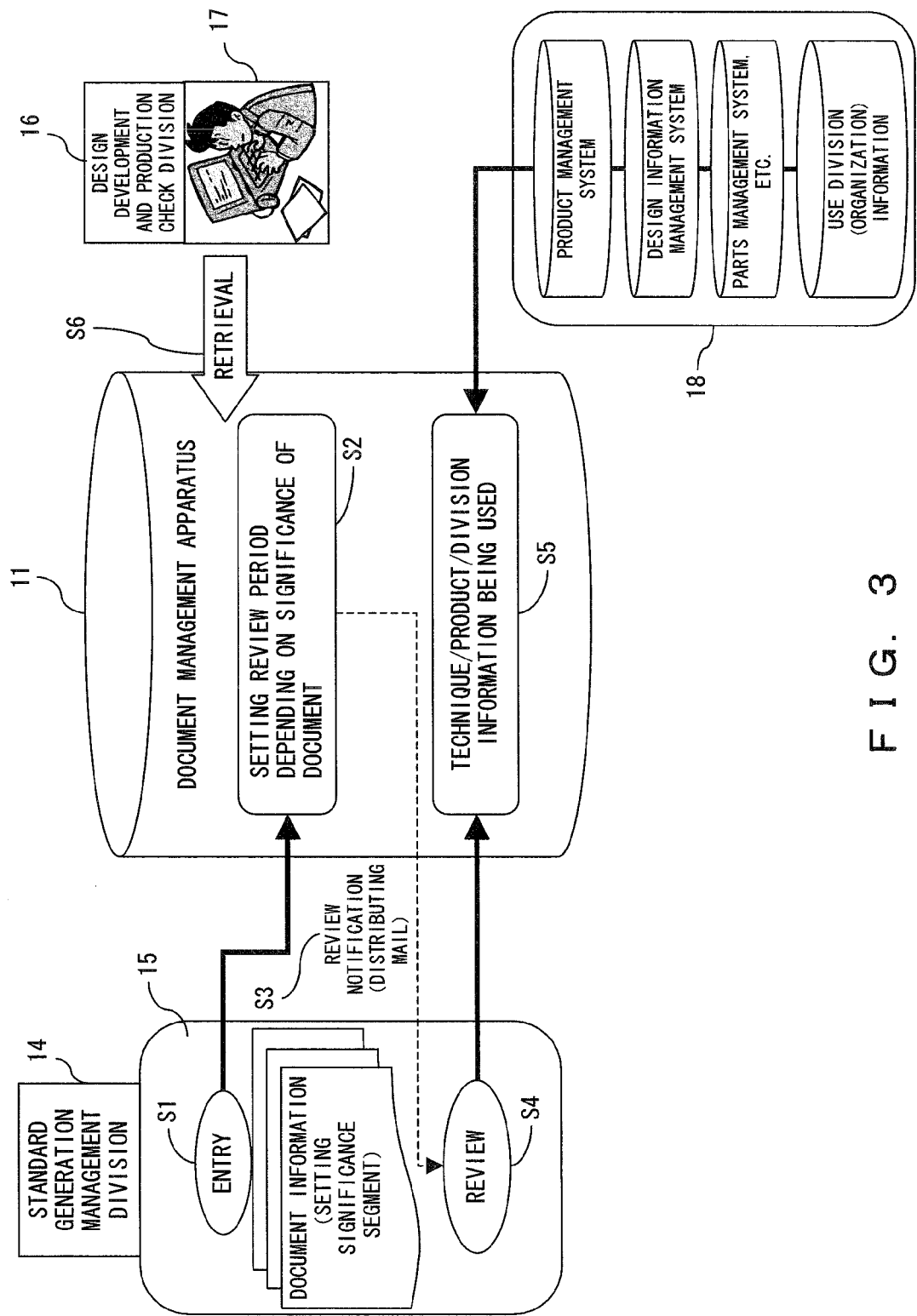
FIG. 3 shows the abstract of the process of the document management system according to an embodiment of the present invention.

FIG. 3 shows the outline of the process of the document management system according to the present embodiment. First, in the standard generation management division system 14, a user (hereinafter the user who uses the PC 15 of the standard generation management division system 14 is referred to as an administrator) uses the 15 to access the document management apparatus 11 over the network 19 and activate a program relating to the present embodiment. Then, the display of the PC 15 displays the main menu screen of the document management system. The administrator uses an input device of the PC 15 and selects a "generate new document" menu on the main menu screen. Thus, a document file entry screen 20 (refer to FIG. 4) is displayed.

On the document file entry screen 20, a document generation screen 40 (FIG. 5) can be accessed. The administrator can generate a document file on the document generation screen 40.

On the document file entry screen 20, the administrator can set a significance segment (segment set depending on the significance of a standard document) for the document file. As an example of setting a significance segment, "α" is set for the planning and developing stage of a product. For the producing and mass-producing stage, for example, "β" is set. For the maintaining and product terminating stage, for example, "γ" is set.

In the PC 15, after inputting necessary information about the document file on the document file entry screen 20 and the document generation screen 40, the document file is entered in the document management apparatus 11 (step 1, and hereinafter "step" is referred to as "S").

Then, the document management apparatus 11 stores the document file data and the document file related data in the storage device 13 under the control of the control device 12. The document management apparatus 11 sets a review period depending on the significance segment of the document file related data (S2). For example, "significance segment=α" refers to the setting for the standard document to be reviewed every sixth month. "Significance segment=β" refers to the setting for the standard document to be reviewed every year.

"Significance segment=γ" refers to the setting for the standard document to be reviewed every third year.

Afterwards, when the review date comes based on the set review period, mail to prompt the administrator of the standard generation management division system 14 to review the document file is transmitted to the mail address of the administrator (S3).

When the administrator who received the mail using the PC 15 retrieves a document file to be reviewed from the storage device 13 of the document management apparatus 11, the administrator opens and reviews the document file (S4). At this time, predetermined data is acquired from the external system 18 (product management system, design information management system, part management system, use division (organization) information, etc.) associated with the document file. If it is necessary to update the file to the latest contents as a result of reviewing the document file, the contents are updated (S5). As an example of the contents to be reviewed, it is determined whether or not there is the technique, product, and division that use the standard of the document file. In performing the reviewing operation, it is determined and examined whether or not it is necessary to revise the contents of the document file by one or plural users.

In S2, when the document management apparatus 11 updates document file data or document file related data, the data before the update is stored as history data. That is, the document file data or document file related data before update (hereinafter referred to as previous review history information) and the organization information at the review (hereinafter referred to as previous review organization information) are stored in the storage device 13. The review organization information refers to the information about the administrator of each document file and/or the information about a management division.

In the design development and production check division system 16, a user can use the PC 17 to retrieve and review (data cannot be updated) a target document file from the storage device 13 of the document management apparatus 11 to refer to and confirm the standard of a product to be developed (S6).

FIG. 4 shows the document file entry screen according to the present embodiment. In FIG. 4, the document file entry screen 20 includes a "standard ID" 21, a "standard name" 22, a "latest version number" 23, an "administrator" 24, a "significance segment" 25, a "status" 26, an "examination information" 27, a "management division" 28, and an "attribute information" 29. Furthermore, the document file entry screen 20 is provided with a "document file" button 30, an "entry" button 31, a "close" button 32, and a "freeze/removal" button 33.

The "standard ID" 21 is an ID for identification of each document file. When the document file entry screen 20 is opened when a file is newly generated, a standard ID automatically numbered by the document management apparatus 11 is displayed on the "standard ID" 21. Thus, the standard ID is assigned to the document file. The "standard name" 22 is the name of the standard corresponding to the "standard ID" 21.

The "latest version number" 23 refers to the latest version number of a document file. For example, when there is a history of the document files of the versions 01, 02, 03, and 04, the latest version number is 04. Therefore, the "latest version number" 23 displays "version 04". The "administrator" 24 displays the information specifying the administrator of the document file (for example, the name, the employee number, etc. of the administrator).

The "significance segment" 25 is a segment for management of a document file, and set depending on the significance of the document. According to the present embodiment, a significance segment can be "α", "β", and "γ" (the priority of the significance is α>β>γ). The type of the significance segment is an example, and is not limited to this example.

The "status" 26 displays the management status of a document. When the version number refers to the initial version (when the document file is newly generated), "set" is displayed. When the version number is 02 through nn (updated), "revised" is displayed. When the plan, production, etc. of a product, part, etc. for which the standard for management of the document file are frozen, "freeze" is displayed, and when they are removed, "remove" is displayed. Relating to the "freeze" and "remove", the screen (not shown in the attached drawings) for selection of the "freeze" or "remove" is displayed when the "freeze/removal" button 33 is pressed. Therefore, when any of them is selected, the selected contents ("freeze" or "remove") are displayed on the "status" 26.

The "examination information" 27 displays a reviewed result (comment) in the examination. For example, "continue with current version number", "freeze/remove with current version number", or "revise and update", etc. is displayed as the result. The "management division" 28 displays the manager (management division) of a document file. The "attribute information" 29 displays, for example, the disclosure information about a document file, a keyword, related document information, etc.

When the "document file" button 30 is pressed, the document generation screen 40 (FIG. 5) is displayed. When the "entry" button 31 is pressed, the contents input on the document file entry screen 20 and the document generation screen (FIG. 5) are entered in the storage device 13 of the document management apparatus 11 over the network 19. When a "close" button 32 is pressed, the document file entry screen 20 is closed, and control is returned to the main menu screen.

The document file entry screen 20 is the screen for examination and update after an examined document file is entered and requested for review. In addition to the document file entry screen 20, a document file update screen (not shown in the attached drawings) is provided. The document file update screen (not shown in the attached drawings) is a screen used when a document file is updated without an examination.

Figure 5:
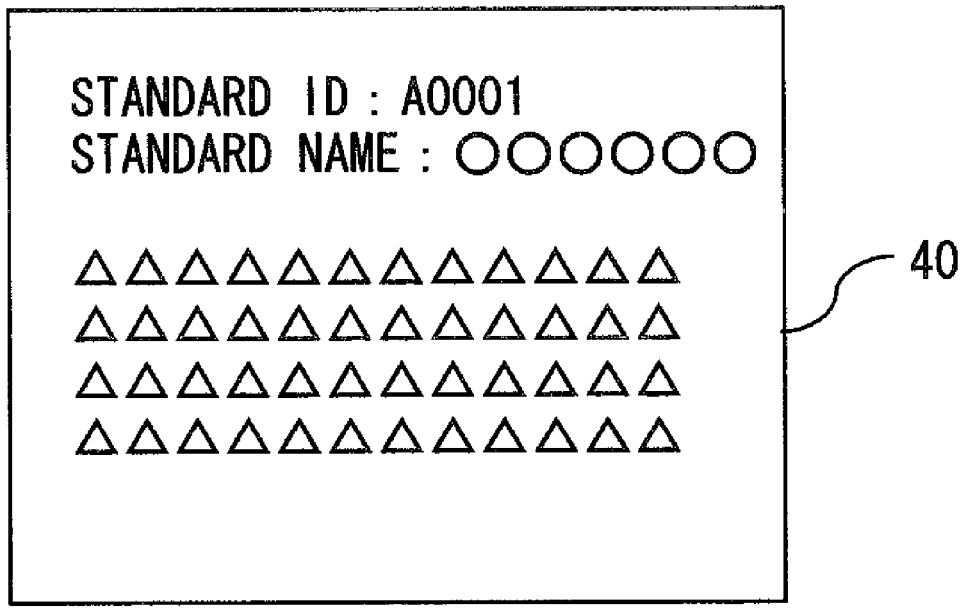
FIG. 5 shows the document generation screen according to an embodiment of the present invention.

FIG. 5 shows a document generation screen according to the present embodiment. The document generation screen 40 is displayed when the "document file" button 30 is pressed. The administrator generates a document file by the PC 15 on the document generation screen 40.

In FIG. 5, the document file displays the automatically numbered standard ID and the name of the standard corresponding to the standard ID. Then, the administrator generates a document relating to the standard (for example, what standard is applied to which product, etc.).

Figure 6:
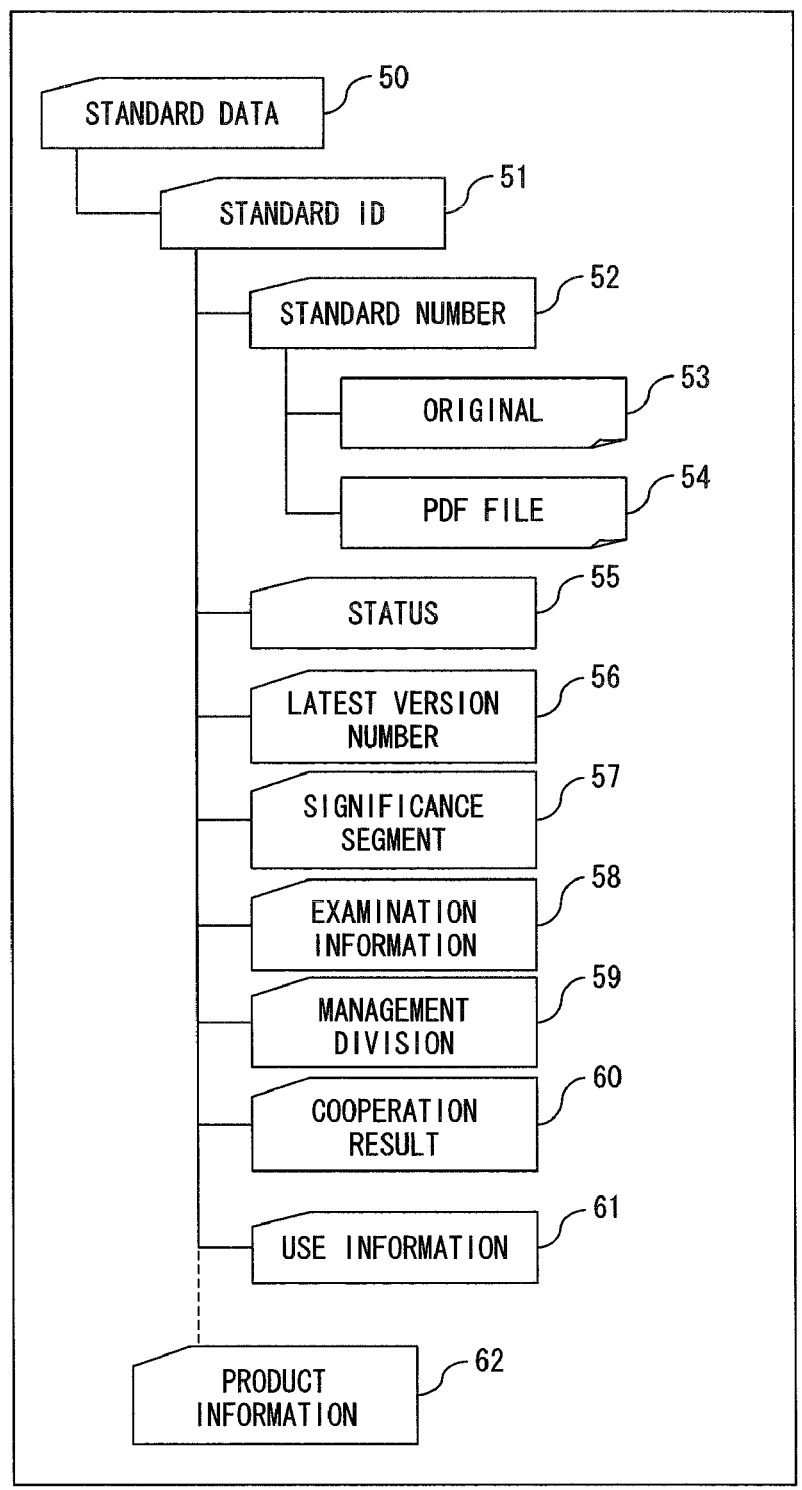
FIG. 6 shows the system of the management status of a document file and document file related data.

FIG. 6 shows the system of the management status of the document file and the document file related data according to the present embodiment. FIG. 6 shows the system of the management status of the document file and the document file related data managed by the document management apparatus 11. In FIG. 6, there are a "standard ID" 51 and "product information" 62 under "standard data" 50. The "standard ID" 51 corresponds to the "standard ID" assigned to each document file and document file related data explained by referring to FIG. 4.

Under the "standard ID" 51, there are a "standard number" 52, a "status" 55, a "latest version number" 56, a "significance segment" 57, "examination information" 58, a "management division" 59, a "cooperation result" 60, and "use information" 61.

The "standard number" 52 is the number (for example, "JIS OOO", etc.) of the standard identified by a standard ID. Under the standard number, the text of a document file and its PDF file are managed.

The "status" 55 is the data corresponding to the "status" 26 shown in FIG. 4. The "latest version number" 56 is the date corresponding to the "latest version number" 23 shown in FIG. 4. The "significance segment" 57 is the data corresponding to the "significance segment" 25 shown in FIG. 4. The "examination information" 58 is the data corresponding to the "examination information" 27 shown in FIG. 4. The "management division" 59 is the data corresponding to the "management division" 28.

The "cooperation result" 60 stores the result information associated with the external system 18 related to the standard ID. The "use information" 61 stores the date and time (browse result) on which a document file managed by the standard ID is browsed, and the update date and time (update result).

The "product information" 62 stores the document file name, etc. used for each product for determination of the validity of a document file. It also stores the shipment information and production information, etc. about a product.

FIG. 7 shows the document file related data table according to an embodiment of the present invention. A document file related data table 70 is a table storing document file related data, and the table is stored in the storage device 13.

The document file related data table 70 comprises the data items such as a "standard ID" 71, a "standard name" 72, a "version number" 73, an "administrator" 74, a "significance segment" 75, a "status" 76, an "examination information" 77, a "management division" 78, an "attribute information" 79, a "review period" 80, a "document examination approval date" 81, a "document update approval date" 82, a "removal flag" 83, a "freeze flag" 84, etc.

Each data item of the document file related data table 70 corresponds to the item input in FIG. 4. The review period is set in the process described later (refer to FIG. 9) The "document examination approval date" 81 is set to the examination approval date when an examination is made and an approval is obtained for the document. The "document update approval date" 82 is set to the date when an approval is obtained if the document file or the document file related data is updated regardless of the approval after an examination. Therefore, when a document file is entered or updated on the document file entry screen 20, the date on which it is entered or updated on the "document examination approval date" 81 or the "document update approval date" 82 and the approval is obtained. However, when a document file is updated on the above-mentioned document file update screen (not shown in the attached drawings), the approval date is set only in the "document update approval date" 82.

The "removal flag" 83 and the "freeze flag" 84 are respectively set from the OFF state to the ON state of the "freeze flag" and the "removal flag" by selecting "freeze" and "remove" for the "status" 26 shown in FIG. 4.

The entry and update of the document file related data table 70 are explained below. First, the entry of a new document file in the document file related data table 70 is explained. When a document file is newly generated on the document file entry screen 20 and the document generation screen 40, a new record for which the generated contents are set is added to the document file related data table 70. The document file data corresponding to the record is stored in a predetermined area of the storage device 13.

Next, the update of a new document file in the document file related data table 70 is explained. When a document file is updated, an updating operation is performed on the document file entry screen 20 and the document generation screen 40. In this case, in the document management apparatus 11, the record having the largest version number in the document file related data records stored in the document file related data table 70 for the standard ID is extracted, and the contents of the record is output to the document file entry screen 20. Furthermore, the document management apparatus 11 outputs the document file corresponding to the record on the document generation screen 40.

After updating the data item or the document file requiring update on the document file entry screen 20 and the document generation screen 40, the administrator presses the "entry" button 31. Thus, the contents input on the document file entry screen 20 and the document generation screen (FIG. 5) are added to the document file related data table 70 as a document file related data record. Furthermore a document file is stored corresponding to the record (added and stored without overwriting). Thus, the history information about the document file related data before update can be stored.

As described above, a record of the document file related data table 70 is added on the document file entry screen 20 or the document generation screen 40 each time a document file or document file related data is updated. The document file data corresponding to the record is also stored in a predetermined area of the storage device 13. The same holds true with the case of update on the document file update screen (not shown in the attached drawings).

FIG. 8 is a flowchart of the operation of the document management apparatus 11 according to the present embodiment. First, in the standard generation management division system 14, the administrator generates a new standard document file on the document file entry screen 20 and the document generation screen 40 using the PC 15. At this time, a standard ID is assigned to the document file (S11). Through an examination, a document file is completed. Then, a significance segment is set, and a document file and its document file related data are entered in the document management apparatus 11 (S12).

In the document management apparatus 11, the control device 12 checks the document file related data table 70 stored in the storage device 13 every day, and determines whether or not the administrator has reviewed each document file in a review period corresponding to the significance segment (S13). Practically, the control device 12 acquires the record of the latest version number of each standard ID stored in the document file related data table 70, reads the "review period" 80 as the data item contained in the record, and makes a check described later (FIG. 10).

In S13, if the administrator has already reviewed data, it is not necessary to review the data any more, control is returned to S13. In S13, if the administrator has not yet reviewed data, the administrator is notified by mail that the review period has come (S14).

Upon receipt of the notification, the document management apparatus 11 retrieves the document file to be reviewed and noticed by the mail based on a operation of the administrator (S15). The document management apparatus 11 also retrieves the information (associated information) about the external system associated with the document file to be reviewed in providing the document file to be reviewed for the administrator at an instruction to retrieve the file (S16).

As a result of the retrieval in S16, when there is associated information (YES in S17), the document file to be reviewed is displayed on the document file entry screen 20 and the document generation screen 40 on the display of the PC 15. Thus, the administrator makes an examination, reviews the document file, and updates the document file (S18).

If there is no associated information (NO in S17) as a result of the retrieval in S16, the document management apparatus 11 transmits an inquiry mail to the related division associated with the document file (S19). The related division which receives the mail determines whether or not there is a product using the standard of a document file to be reviewed, and transmits a reply mail of a check result to the administrator of the standard generation management division system 14.

The administrator of the standard generation management division system 14 receives a reply mail from the related division (S20), and confirms the contents. According to the result of the contents, the administrator determines whether or not the document file is to be frozen or removed. When the file is to be frozen or removed, the freeze or remove is set (S21). The setting is performed by first selecting "freeze" or "remove" of the "status" 26 shown in FIG. 4, pressing the "entry" button 31, thereby turning on the "freeze flag" 84 and the "removal flag" 83 of the document file related data record to be added to the document file related data table 70.

In the document management apparatus 11, when the "freeze flag" 84 or the "removal flag" 83 entered in S21 is OFF (NO in S22), control is returned to S13. When the "freeze flag" or the "removal flag" is ON (YES in S22), the freezing process or the removing process is performed on the document file or the document file related data. The freezing process or the removing process is performed as a non-disclosed process (restriction of browsing) so that reference is prevented from the PC 15 or PC 17 in a system (S23). Then, control is returned to step S13.

Figure 9:
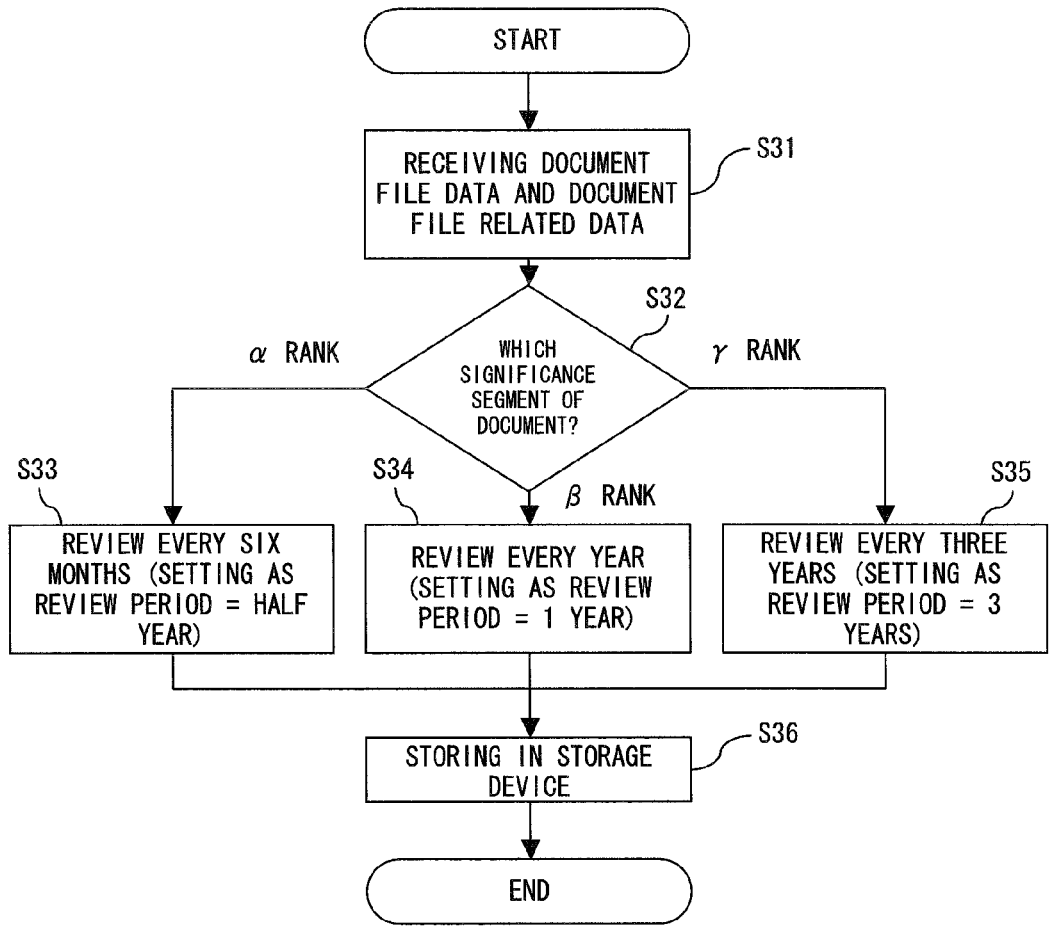
FIG. 9 is a flowchart of the process of entering a document file of the document management apparatus 11 according to an embodiment of the present invention.

FIG. 9 is a flowchart of the process of entering a document file of the document management apparatus 11 according to the present embodiment. The flowchart corresponds to the entering process (S12).

First, the PC 15 generates document file data and document file related data on the document file entry screen 20 and the document generation screen 40. When the "entry" button 31 is pressed, the document file data and the document file related data are transmitted to the document management apparatus 11.

Then, the control device 12 of the document management apparatus 11 receives the document file data and the document file related data (S31). Then, the control device 12 reads a program according to the present embodiment from the storage device 13, and performs the following process.

First, the control device 12 reads the significance segment from the document file related data received in S31. As a result of the read, in the case of "significance segment=α" (S32), the control device 12 sets "review period=half year" (S33). As a result of the read, in the case of "significance segment=β" (S32), the control device 12 sets "review period=a year" (S34). As a result of the read, in the case of "significance segment=γ" (S32), the control device 12 sets "review period=three years" (S35).

After setting the review period, the control device 12 stores the received document file data and document file related data in the storage device 13 (S36). The document file related data is stored in the document file related data table 70 as explained in FIG. 7.

FIG. 10 is a flowchart of the review period check process by the document management apparatus 11 according to the present embodiment. The flowchart corresponds to the process in S13 shown in FIG. 8. The review period check process is performed every day by the document management apparatus 11.

First, the control device 12 acquires the record having the largest "version number" 73 of each standard ID of the document file related data table 70 stored in the storage device 13 (S41).

Next, the control device 12 extracts the document file related data (record) satisfying the condition of "today's date=document examination approval date+review period−N months" (S42). The N (N is a positive integer) months are the period in which a reviewing operation is performed after a practical examination for review. According to the present embodiment, for example, "N=one (month)" is defined.

For example, an example of the standard ID "A0001" shown in FIG. 7 is explained below. Assume that the today's date is "Mar. 25, 2005", the document examination approval date is "Oct. 25, 2004", and the review period is "half year (6 months)". In this case, since "document examination approval date+review period−1 month=Oct. 25, 2004+6 months−one month=Mar. 25, 2005", it matches the today's date. Therefore, the document file related data record is to be extracted. In this case, it is necessary for the administrator to review the data in one month from Mar. 25, 2005 to Apr. 25, 2005 (review term).

Next, the control device 12 determines "document update approval date>document examination approval date" for a record group of the document file related data extracted in S42 (S43). In this example, the "document examination approval date" 81 is compared with the "document update approval date" 82.

When "document update approval date" 82>"document examination approval date" 81 ("YES" in S43), the document file is updated on or after the closest "document examination approval date". Therefore, the document file is not to be reviewed, and the flowchart terminates.

When "document update approval date" 82<"document examination approval date" 81 ("NO" in S43) and if the document file has not been updated from the closest document examination approval date, the mail (review notification mail) notifying that the document file is to be reviewed is transmitted to the "administrator" 74 of the document file (S44).

When the review notification mail is transmitted to an "administrator", the control device 12 acquires the mail address from the personnel system as one of the external systems 18 and transmits it.

FIG. 11 is a flowchart to be performed in review by the document management apparatus 11 according to the present embodiment. The flowchart corresponds to the processes in S14 through S23 shown in FIG. 8. The left portion of FIG. 11 shows the process on the administrator side, and the right portion of FIG. 11 shows the process performed by the document management apparatus 11.

As explained by referring to FIG. 10 above, the control device 12 transmits the review notification mail to the mail address of the administrator (S51). The administrator receives the mail through the PC 15 (S52). The administrator confirms the contents of the mail, and performs the operation of retrieving a document file to be reviewed using the 15 (S53).

The control device 12 retrieves the document file at a retrieve instruction from the administrator in S53. Practically, the document file data and the document file related data record of the largest version number are acquired from the storage device 13 using the standard ID of the document file as a key.

The control device 12 retrieves whether or not there is the information (associated information) about another external system associated with the document file (S54). According to the associated information, it is determined whether or not a file is associated with another system by retrieving the "product information" 62 (product information table) shown in FIG. 6. That is, it is determined whether or not the current standard is used in the product.

When there is the associated information as a result of the retrieval in S54 (YES in S55), the control device 12 outputs the retrieved document file and associated information to the PC 15 (S56). If the administrator requires update as a result of the review of the document file and the associated information, the document file is updated on the document file entry screen 20 and the document generation screen 40. For example, the administrator can update the contents of the document file on the document generation screen 40, resets the "significance segment" 25 on the document file entry screen 20, and input the "examination information" 27, etc.

When the reviewing operation is completed, the administrator presses the "entry" button 31 on the document file entry screen 20. Then, the document file data and the document file related data reset on the document file entry screen 20 and the document generation screen 40 are transmitted to the document management apparatus 11.

Upon receipt of the document file data and the document file related data, the control device 12 updates the document file and the document file related data stored in the storage device 13 (S58). Adding the document file related data record to the document file related data table 70 associated with the updating operation is explained above by referring to FIG. 7. Furthermore, since the history of the document file data is also managed, the storage device 13 also stores the document file data before update. In the process in S58, the process shown in FIG. 9 is also performed.

If there is no associated information (NO in S55) as a result of the retrieval in S54, the control device 12 transmits inquiry mail to related division (S59). A related division refers to, for example, a division, an external system, etc. that have ever used (browsed or updated) based on the document file. The information about the related division is stored in the data "cooperation result" 60 (associated result table).

The control device 12 refers to the associated result table, and retrieves the division related to the document file. Then, the control device 12 transmits the mail (inquiry mail) inquiring about the use information about the document file (standard) to a predetermined mail address of the division. The mail also describes the mail address of the administrator of the document file.

A predetermined person of the related division as an inquiry destination confirms the inquiry mail and checks the use status of the product, parts, etc. according to the standard. Then, the person of the related division notifies the administrator of the document file described in the inquiry mail of the use status, etc.

The administrator receives the mail from the related division by the PC 15, and confirms the contents (S60). Then, depending on the contents of the mail from the related division, the administrator uses the PC 15 and displays the document file entry screen 20. Then, the administrator presses the "freeze/removal" button 33, and displays the screen (not shown in the attached drawings) for selection of "freeze" or "remove". When the administrator determines that it is necessary to "freeze" the standard by the document file, the administrator selects "freeze". When the administrator determines that it is necessary to "remove" the standard by the document file, the administrator selects "remove". When the setting terminates using the PC 15, the administrator presses the "entry" button 31.

Then, the document file related data set by the PC 15 is transmitted to the document management apparatus 11, and added to the document file related data table 70.

The control device 12 performs a freezing/removing process on the document file related data for which the "freeze flag" or "removal flag" is ON (S63). In this example, for example, a non-disclosed process (restricting the browsing of the document file) is performed so that the file cannot be referenced by the PC 15 or the PC 17.

The user of the design development and production check division system 16 can access the document management apparatus 11 using the PC 17, retrieve a necessary document file, and refer to it. At this time, by specifying the version number of the document file, the document file corresponding to the version number can be retrieved. Based on the significance segment set for the document file, a user who can refer to the file can be restricted.

Figure 12:
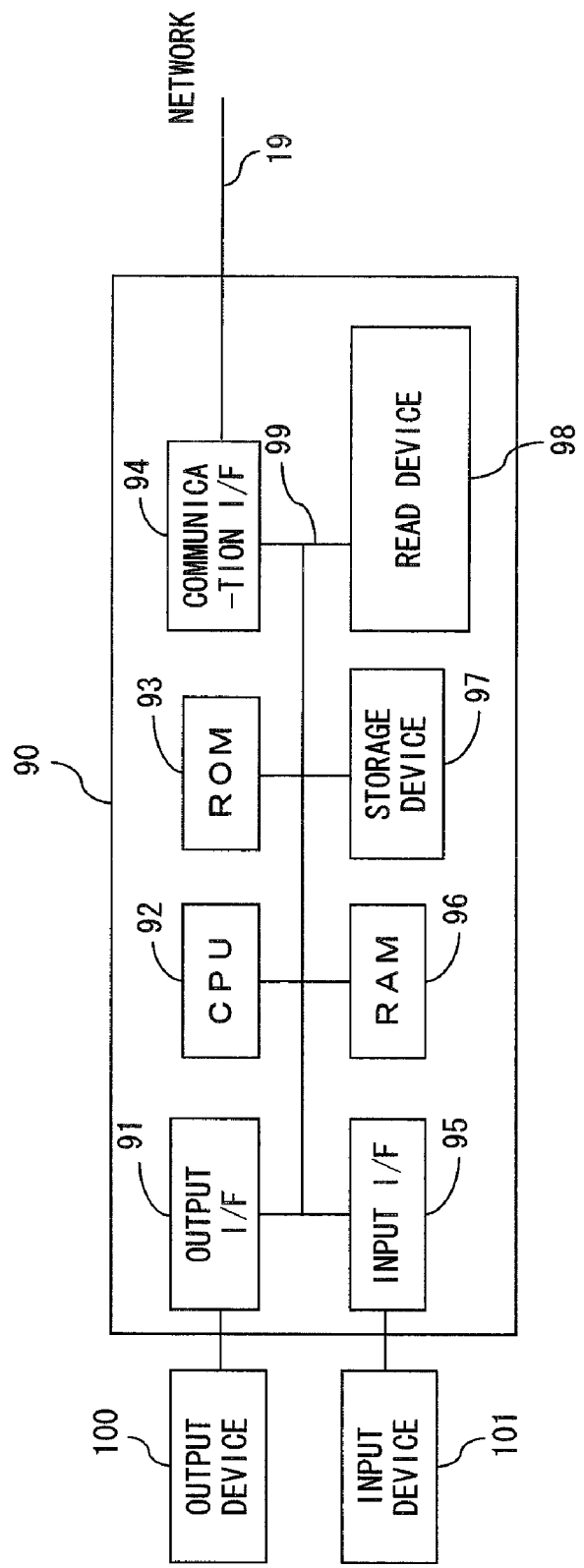
FIG. 12 is a block diagram of the configuration of the hardware environment of the document management apparatus 11 according to an embodiment of the present invention.

FIG. 12 is a block diagram of the configuration of the hardware environment of the document management apparatus 11 according to the present embodiment. In FIG. 12, the document management apparatus 11 comprises a CPU 92, read-only memory (ROM) 93, random-access memory (RAM) 96, a communication interface (hereinafter an interface is referred to as I/F) 94, a storage device 97, an output I/F 91, an input I/F 95, a read device 98 of a portable storage medium, a bus 99 via which all the above-mentioned components are connected, an output device 100 connected to the output I/F 91, and an input device 101 connected to the input I/F 95. The CPU 92 corresponds to the control device 12.

The storage device 97 can be various types of storage devices such as a hard disk, a magnetic disk, etc. The above-mentioned storage device 97 or ROM 93 stores a program of the flow according to the above-mentioned embodiment. The storage device 97 stores the document file data, document file related data, associated result table, product information table, and other table groups used in the above-mentioned embodiments.

A program according to the present embodiment can be stored in, for example, the storage device 97 through the network 19 and the communication I/F 94 from a program provider. The program can also be marketed, stored in a distributed portable storage medium, set in the read device 98, and executed by the CPU 92. A portable storage medium can be various types of storage media such as CD-ROM, a flexible disk, an optical disk, a magneto optical disk, an IC card, etc., and the program stored in the storage medium is read by the read device 98.

The input device 101 can be a keyboard, a mouse, an electronic camera, a microphone, a scanner, a sensor, a tablet, etc. The output device 100 can be a display, a printer, a speaker, etc. The network 19 can be a communication network such as the Internet, a LAN, a WAN, a dedicated line, a cable, a wireless, etc.

The present invention is not limited to the above-mentioned embodiment, but various configurations or aspects can be devised within the scope of the gist of the present invention. Therefore, in the description above of the present embodiment, the standard document is explained. However, the present invention is not limited to this, and can be applied to various types of document files.

As described above, according to the present invention, the significance segment can be set for each document, and a review period can be set depending on the significance segment. That is, based on the setting of the significance segment of a document, the review period (term) depending on the strategic importance can be set, and the latest information (document) can be constantly provided.

Thus, since a notification that the document file is to be reviewed in a review period can be received, the document file can be reviewed without fail in a review period depending on the significance of the document file. Therefore, the document file can be constantly maintained in the latest status depending on the significance.

According to the present invention, the significance depending on the strategic importance of a document can be added to the document file. If the review date has come depending on the significance, the user can be prompted to review the document file. Thus, the document file can be constantly maintained at the latest status in a review period.

What is claimed is:

1. A document management computer system for performing a process of managing document file data, wherein the processor performs:

acquiring the document file data relating to a standard of a product, and document file related data as data relating to the document file data which includes a priority of a significance set in advance according to one of a planning stage, a developing stage, a producing stage, a mass-producing stage, a maintaining stage, and a product terminating stage of the product, the priority of the significance depending on a significance of the document file data, through an input interface;

storing at least the acquired document file related data in a storage device;

setting a cycle for reviewing the document file data according to the priority of the significance in the stored document file related data;

determining using the cycle whether or not a review date on which the document file data is to be reviewed has come; and transmitting to a user a message relating to the document file data according to a determination result of whether or not the review date on which the document file data is to be reviewed has come, through an output interface, wherein the process is performed by at least a processor of the computer system.

2. The computer system according to claim 1, wherein the processor further performs determining whether or not the document file data has already been reviewed in the cycle.

3. The computer system according to claim 1, wherein the document file related data comprises at least a document ID for identification of the document file data, the priority of the significance, a version number of the document file data, an examination date on which an examination is performed when the document file data is updated, and an update date of the document file data.

4. The computer system according to claim 3, wherein the processor further performs:

extracting the document file related data having a largest version number of each document ID on the document file related data stored in the storage device;

extracting the document file related data for which the review date has come using the cycle and the set examination date in the extracted document file related data; and extracting the document file related data whose update date is later than the examination date of the extracted document file related data.

5. The computer system according to claim 1, wherein the processor further performs, determining whether or not associated data is present, the associated data being associated with the document file data to be reviewed according to the review notification and which indicates the product for which the standard of the product according to the document file data being used;

transmitting the document file data, the document file related data, and the associated data, through the output interface when it is determined that the associated data is present; and notifying a user who uses the document file data according to a history information using the document file data that the user is to inquire about use status of the document file data when it is determined that there is no associated data.

6. The computer system according to claim 5, wherein the processor further restricts reference of the document file data using data indicating whether or not the document file data is to be frozen or is to be removed in the acquired document file related data.

7. A non-transitory computer-readable storage medium storing a document management program used to direct a computer to perform a process of managing document file data comprising:

acquiring the document file data relating to a standard of a product, and document file related data as data relating to the document file data which includes a priority of a significance set in advance according to one of a planning stage, a developing stage, a producing stage, a mass-producing stage, a maintaining stage, and a product terminating stage of the product, the priority of the significance depending on a significance of the document file data;

storing at least the acquired document file related data in a storage device;

setting a of cycle for reviewing the document file data according to the priority of the significance in the stored document file related data;

determining using the cycle whether or not a review date on which the document file data is to be reviewed has come; and prompting a user to review the document file data according to the determining process.

8. The storage medium according to claim 7, wherein said determining determines whether or not the document file data has been reviewed in the cycle.

9. The storage medium according to claim 7, wherein:

the document file related data comprises at least a document ID for identification of the document file data, the priority of the significance, a version number of the document file data, an examination date on which an examination is performed when the document file data is updated, and an update date of the document file data.

10. The storage medium according to claim 9, wherein the determining comprises:

extracting the document file related data having a largest version number of each document ID on the document file related data stored in the storing process;

extracting the document file related data for which the review date has come using the cycle and the examination date set in the cycle setting process in the document file related data extracted in the first extracting process; and extracting the document file related data whose update date is later than the examination date of the document file related data extracted in the second extracting process.

11. The storage medium according to claim 7, wherein the process further comprising determining whether or not associated data is present, the associated data being associated with the document file data to be reviewed according to the review notification and which indicates the product for which the standard of the product according to the document file data being used;

transmitting the document file data, the document file related data, and the associated data when it is determined that the associated data is present; and notifying a user who uses the document file data according to a history information using the document file data that the user is to inquire about use status of the document file data when it is determined that there is no associated data.

12. The storage medium according to claim 11, wherein the process further comprising restricting reference of the document file data using data indicating whether or not the document file data is to be frozen or is to be removed in the document file related data acquired in the acquiring the document file data.

13. A document managing method for managing document file data, comprising:

acquiring the document file data relating to a standard of a product, and document file related data as data relating to the document file data which includes a priority of a significance set in advance according to one of a planning stage, a developing stage, a producing stage, a mass-producing stage, a maintaining stage, and a product terminating stage of the product, the priority of the significance depending on a significance of the document file data;

storing at least the acquired document file related data in a storage device;

setting a cycle for reviewing the document file data according to the priority of the significance in the stored document file related data;

determining using the cycle whether or not a review date on which the document file data is to be reviewed has come; and prompting a user to review the document file data according to the determination result.

14. The method according to claim 13, wherein it is further determined in the determination whether or not the document file data has already been reviewed in the cycle.

15. The method according to claim 13, further comprising determining whether or not associated data is present, the associate data being associated with the document file data to be reviewed according to the review notification and which indicates the product for which the standard of the product according to the document file data being used;

transmitting the document file data, the document file related data, and the associated data when it is determined that the associated data is present; and notifying a user who uses the document file data according to a history information using the document file data that the user is to inquire about use status of the document file data when it is determined that there is no associated data.

* * * * *